US012624823B2

(12) United States Patent
Liu

(10) Patent No.: US 12,624,823 B2
(45) Date of Patent: May 12, 2026

(54) LAMP

(71) Applicant: Guangdong Bravo New Energy Technology Co. LTD., Foshan (CN)

(72) Inventor: Ziang Liu, Foshan (CN)

(73) Assignee: Guangdong Bravo New Energy Technology Co. LTD., Foshan City (CN)

( * ) Notice: Subject to any disclaimer, the term of this patent is extended or adjusted under 35 U.S.C. 154(b) by 0 days.

(21) Appl. No.: 18/898,625

(22) Filed: Sep. 26, 2024

(65) Prior Publication Data

US 2026/0085828 A1 Mar. 26, 2026

(51) Int. Cl.

| | |
|---|---|
| ***F21V 23/06*** | (2006.01) |
| ***F21S 4/20*** | (2016.01) |
| ***F21S 8/00*** | (2006.01) |
| ***F21V 3/02*** | (2006.01) |
| ***F21V 17/16*** | (2006.01) |
| ***F21V 23/00*** | (2015.01) |
| ***F21V 23/04*** | (2006.01) |

(52) U.S. Cl.
CPC ................ *F21V 23/06* (2013.01); *F21S 4/20* (2016.01); *F21S 8/033* (2013.01); *F21V 3/02* (2013.01); *F21V 17/164* (2013.01); *F21V 23/002* (2013.01); *F21V 23/04* (2013.01)

(58) Field of Classification Search
CPC .................. F21S 4/20–28; F21V 3/02; F21V 17/16–168; F21V 23/00–06
See application file for complete search history.

(56) References Cited

U.S. PATENT DOCUMENTS

| | | | | |
|---|---|---|---|---|
| 7,192,160 | B2 * | 3/2007 | Reiff, Jr. ................. | F21V 23/04 362/228 |
| 7,549,780 | B2 * | 6/2009 | Caluori ................. | F21V 23/026 362/404 |
| 7,556,396 | B2 * | 7/2009 | Kuo .......................... | F21K 9/65 362/240 |
| 11,391,424 | B2 * | 7/2022 | Chen ....................... | F21V 21/30 |
| 2023/0417375 | A1 * | 12/2023 | Wu ........................ | H05B 45/30 |

* cited by examiner

*Primary Examiner* — Jason M Han

(57) ABSTRACT

A lamp includes a lamp body, a left end cover and a right end cover detachably connected to each of two sides of the lamp body. The lamp body includes at least one light source board; the right end cover is provided with a plug for connecting to an external power source, and the plug is electrically connected to the light source board, The left end cover is provided with an electrical connector socket for connecting to an external control circuit. The electrical connector socket is provided with a plurality of plug-in slots on one side adjacent to an interior of the lamp body. At least one conductive plate is arranged in each of the plug-in slots, and the at least one conductive plate is electrically connected to the light source board.

18 Claims, 12 Drawing Sheets

LAMP

CROSS-REFERENCE TO RELATED APPLICATIONS

The application claims priority of Chinese patent application CN 202422321404.2, filed on Sep. 23, 2024, which is incorporated herein by reference in its entireties.

TECHNICAL FIELD

The present invention relates to the field of illumination, in particular to a lamp.

BACKGROUND ART

During the utilization of long-strip lamps, a plurality of long-strip lights need to be installed and these lights are connected to each other through wires. During the installation process, a plurality of lamps need to be connected in sequence, which results in cumbersome and complex installation steps. Moreover, during the subsequent use, problems such as poor contact tend to occur and the wires are often exposed, thus not only affecting the overall appearance but also posing potential safety hazards.

SUMMARY

In order to solve above problems, the present disclosure provides a multifunctional lamp mounting box which is convenient to install and is able to effectively solve the problem of poor wiring contact and reduce safety risk.

The technical solution adopted by the present invention to solve its technical problems is as follows. A lamp includes: a lamp body, a left end cover and a right end cover detachably connected to each of two sides of the lamp body, wherein the lamp body includes at least one light source board; the right end cover is provided with a plug for connecting to an external power source, and the plug is electrically connected to the light source board; the left end cover is provided with an electrical connector socket for connecting to an external control circuit, the electrical connector socket is provided with a plurality of plug-in slots on one side adjacent to an interior of the lamp body, at least one conductive plate is arranged in each of the plug-in slots, and the at least one conductive plate is electrically connected to the light source board.

Further, the electrical connector socket includes a first end and a second end, the second end extends from an inner wall surface of the first end, the first end is arranged outside the left end cover and abuts against an outer wall surface of the left end cover, the second end is arranged inside the left end cover and extends towards the interior of the lamp body, the first end is provided with a plurality of plug-in holes for connecting to the external control circuit, and the plug-in slot is arranged inside the second end and is connected to the plug-in hole.

Further, the conductive plate is bent and molded to be installed in the plug-in slot, the at least one conductive plate includes a first conductive plate and a second conductive plate, a bend part is arranged between the first conductive plate and the second conductive plate, and a distance between the first conductive plate and the second conductive plate gradually increases along a direction away from the bend part.

Further, the second end includes a first baffle and a second baffle, the first baffle and the second baffle extend from the inner wall surface of the first end and are integrally formed with the first end, the plug-in slot is limited by the first baffle and the second baffle, a fixing board extends upwards from a bottom edge of the first baffle and is integrally formed with the first baffle, a first accommodating part is arranged between the first baffle and the fixing board for accommodating the first conductive plate, a second accommodating part is arranged between the second baffle and the fixing board for accommodating the second conductive plate, and the bent part is positioned against an inner wall of the left end cover by the fixing board.

Further, a limiting part extending toward the first baffle is provided at a top of the second baffle, and the limiting part is configured to limit a movement of the conductive plate in a longitudinal direction.

Further, a contact bump formed by folding back from an edge of the second conductive plate is provided on the second conductive plate, a wiring pin is provided on one side of the contact bump adjacent to the interior of the lamp body, and the wiring pin is connected to the light source board through an electric wire.

Further, the lamp body further includes at least one strip tubular lampshade, the light source board is a strip light source board, and the strip light source board is arranged inside the at least one strip tubular lampshade.

Further, the lamp body further includes a housing, each of two ends of the housing is detachably connected to the left end cover and the right end cover respectively, and the housing includes two sidewalls and a top wall positioned between the two sidewalls.

Further, the left end cover and the right end cover are provided with a first limit block and a second limit block at an edge of each of two sides of the left end cover and the right end cover, and at least a portion of the first limit block and at least a portion of the second limit block surround to form a limit groove for accommodating the sidewall.

Further, the left end cover and the right end cover include an upper housing and a lower housing, the upper housing is provided with a concave portion, the lower housing is provided with a convex portion, the concave portion is able to receive the convex portion such that the upper housing is detachably installed in the lower housing.

Further, an inner wall of the upper housing is provided with at least one first snap-in portion on one side of the interior of the lamp body, and the first snap-in portion is configured to fixedly install the light source board.

Further, an inner wall of the lower housing is provided with at least one second snap-in portion on one side of the interior of the lamp body, the first snap-in portion and the second snap-in portion cooperate to form a fixing cavity, and the fixing cavity is configured to fixedly install the at least one strip tubular lampshade.

Further, the first snap-in portion and the second snap-in portion are respectively provided with a protrusion on an inner wall surface of the first snap-in portion and the second snap-in portion, and the protrusion is configured to fasten the at least one strip tubular lampshade.

Further, at least one recessed portion is provided at each of two ends of the top wall, at least one mounting hole is provided in the recessed portion, a threaded hole is provided at a top end of the first snap-in portion, the mounting hole corresponds to the threaded hole, a bolt is inserted into the mounting hole, and the bolt passes through the mounting hole and extends into the threaded hole to be screwed, so that the lower housing is detachably connected to the top wall.

Further, the top wall is further provided with a hook part configured to be connected to a wall.

Further, the hook part includes a first hanging portion, a second hanging portion and a first joining portion, one end of the first hanging portion and one end of the second hanging portion are fixedly connected to the top wall respectively, the other end of the first hanging portion and the other end of the second hanging portion intersect and are connected together through the first joining portion, a wall nail is connected to the first joining portion, and the wall nail is configured to fixedly connect the hook part to the wall.

Further, the hook part further includes a third hanging portion and a fourth hanging portion, the third hanging portion includes a first connecting element and a second connecting element, one end of the first connecting element and one end of the second connecting element are fixedly connected to the top wall respectively, the other end of the first connecting element and the other end of the second connecting element are connected together through the fourth hanging portion and thus the third hanging portion has a “V”-shaped structure, the wall nail is further connected to the fourth hanging portion, and the wall nail is configured to fixedly connect the hook part to the wall.

Further, the left end cover and the right end cover are provided with a guide hole and a limit hole respectively, the guide hole and the limit hole are configured to allow an external connecting portion to pass through and thus the lamp connects to the wall, an edge portion of the guide hole intersects an edge portion of the limit hole thus the guide hole and the limit hole are connected, and a diameter of the guide hole is not less than a diameter of the limit hole.

Further, a mounting base is further arranged in the right end cover, a switching device is arranged in the mounting base, and the switching device is electrically connected to the light source board and the plug.

Further, a capacitor and a circuit board electrically connected to the capacitor are further arranged in the right end cover, and the capacitor and the circuit board are electrically connected to the switching device.

Beneficial effects of the present invention are as follows. The electrical connector socket is provided with two plug-in slots. It should be noted that the electrical connector socket can be provided with three plug-in slots, or can be provided with any desired number of plug-in slots.

The modular design of the lamp body, the left end cover and the right end cover makes the production and assembly of the lamp more flexible. Moreover, by arranging the electrical connector socket, the connection between the lamp and the external control circuit is more convenient and efficient, which means that a user only needs to insert the external control circuit into the plug-in slots of the electrical connector socket to complete the electrical connection, thereby reducing the installation time and complexity.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
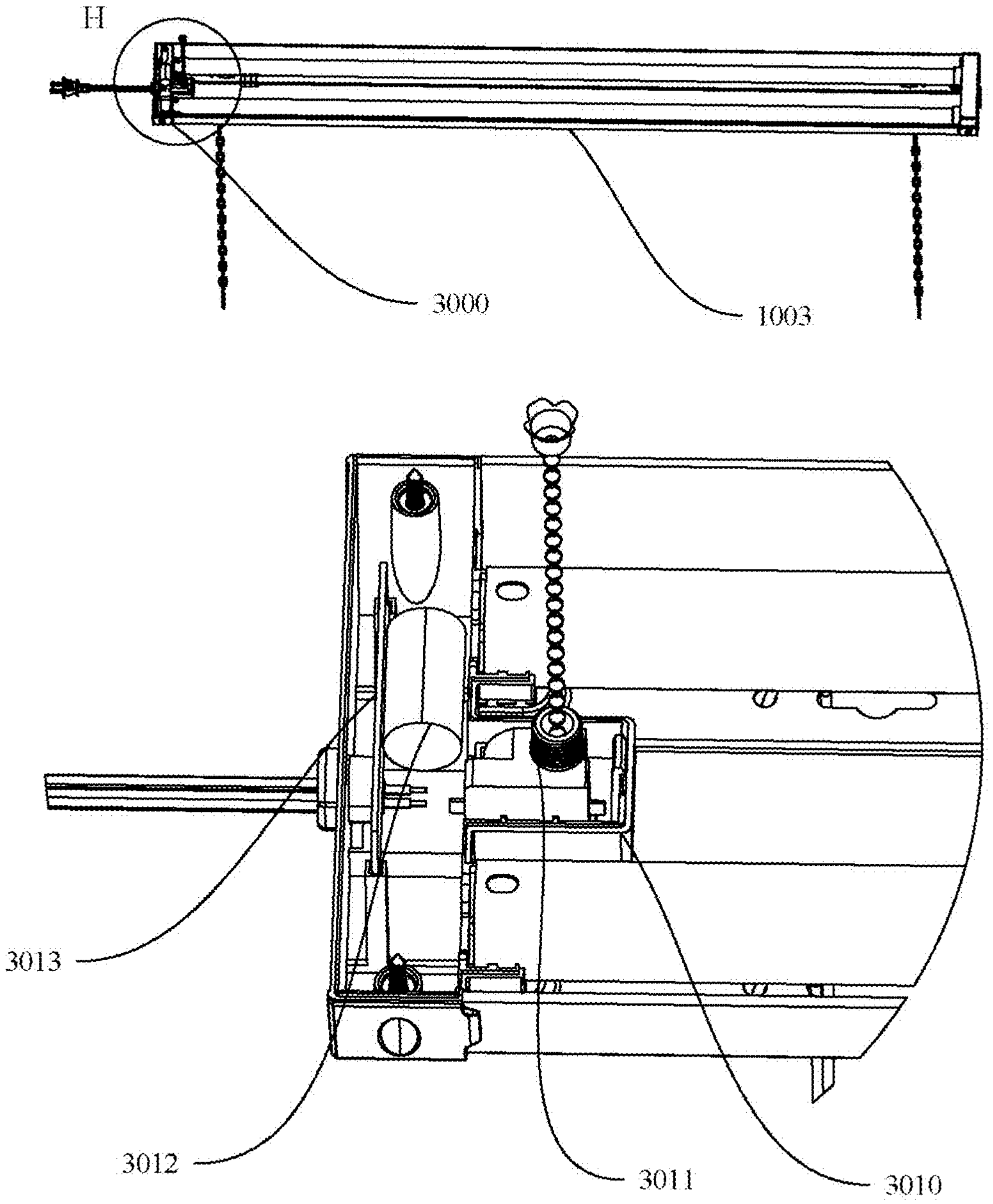
FIG. 1 is a schematic diagram of an overall structure of a lamp of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second” may explicitly or implicitly include one or more of the features. In the description of embodiments of the application, “a plurality of” means two or more, unless otherwise specifically defined.

Figure 2:
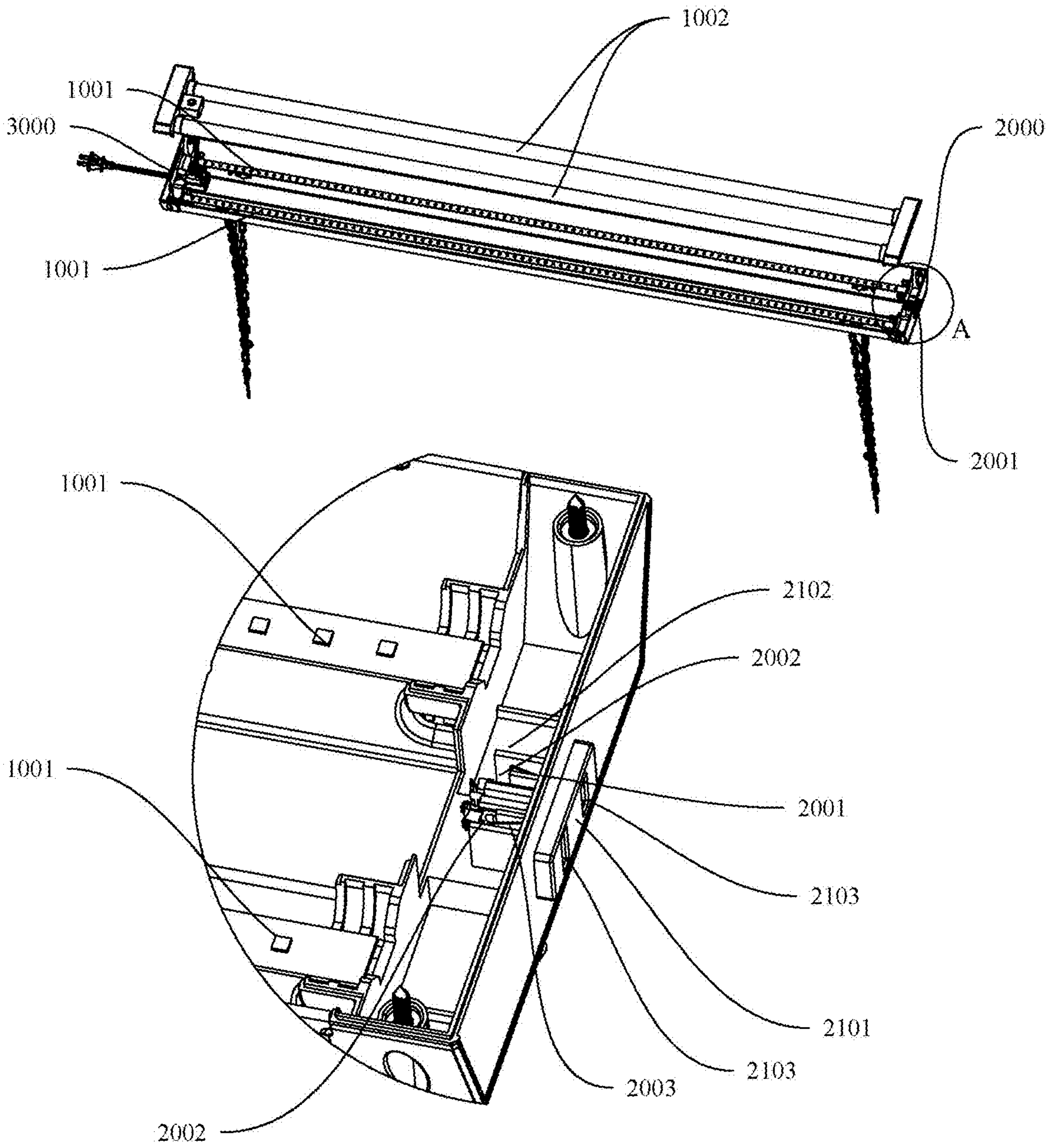
FIG. 2 is a partial enlarged structural diagram of an area H of FIG. 1.

Referring to FIG. 1 to FIG. 2, the present invention is provided with a lamp 100. The lamp 100 includes a lamp body 1000, a left end cover 2000 and a right end cover 3000 detachably connected to each of two sides of the lamp body 1000. The lamp body 1000 includes at least one light source board 1001. The right end cover 3000 is provided with a plug 3001 for connecting to an external power source, and the plug 3001 is electrically connected to the light source board 1001. The left end cover 2000 is provided with an electrical connector socket 2001 for connecting to an external control circuit, the electrical connector socket 2001 is provided with a plurality of plug-in slots 2002 on one side adjacent to an interior of the lamp body 1000, at least one conductive plate 2003 is arranged in each of the plug-in slots 2002, and at least one conductive plate 2003 is electrically connected to the light source board 1001. As a preference in this embodiment, the electrical connector socket 2001 is provided with two plug-in slots 2002. It should be noted that the electrical connector socket 2001 can be provided with three plug-in slots 2002, or can be provided with any desired number of plug-in slots 2002. The modular design of the lamp body 1000, the left end cover 2000 and the right end cover 3000 makes the production and assembly of the lamp 100 more flexible. Moreover, by arranging the electrical connector socket 2001, the connection between the lamp 100 and the external control circuit is more convenient and efficient, which means that a user only needs to insert the external control circuit into the plug-in slots 2002 of the electrical connector socket 2001 to complete the electrical connection, thereby reducing the installation time and complexity.

In this embodiment, referring to FIG. 2, the electrical connector socket 2001 includes a first end 2101 and a second end 2102, the second end 2102 extends from an inner wall surface of the first end 2101, the first end 2101 is arranged outside the left end cover 2000 and abuts against an outer wall surface of the left end cover 2000, the second end 2102 is arranged inside the left end cover 2000 and extends towards the interior of the lamp body 1000, the first end 2101 is provided with a plurality of plug-in holes 2103 for connecting to the external control circuit, and the plug-in slot 2002 is arranged inside the second end 2102 and is connected to the plug-in hole 2103. As a preference in this embodiment, two plug-in holes 2103 are provided, or can be provided with any desired number of plug-in holes 2103. The electrical connector socket 2001 of this embodiment has a relatively compact structure, and effectively improves the flexibility and reliability of electrical connection. In this embodiment, the electrical connector socket 2001 has a high level of structural compactness, and thus effectively improves the flexibility and reliability of electrical connection.

Figure 3:
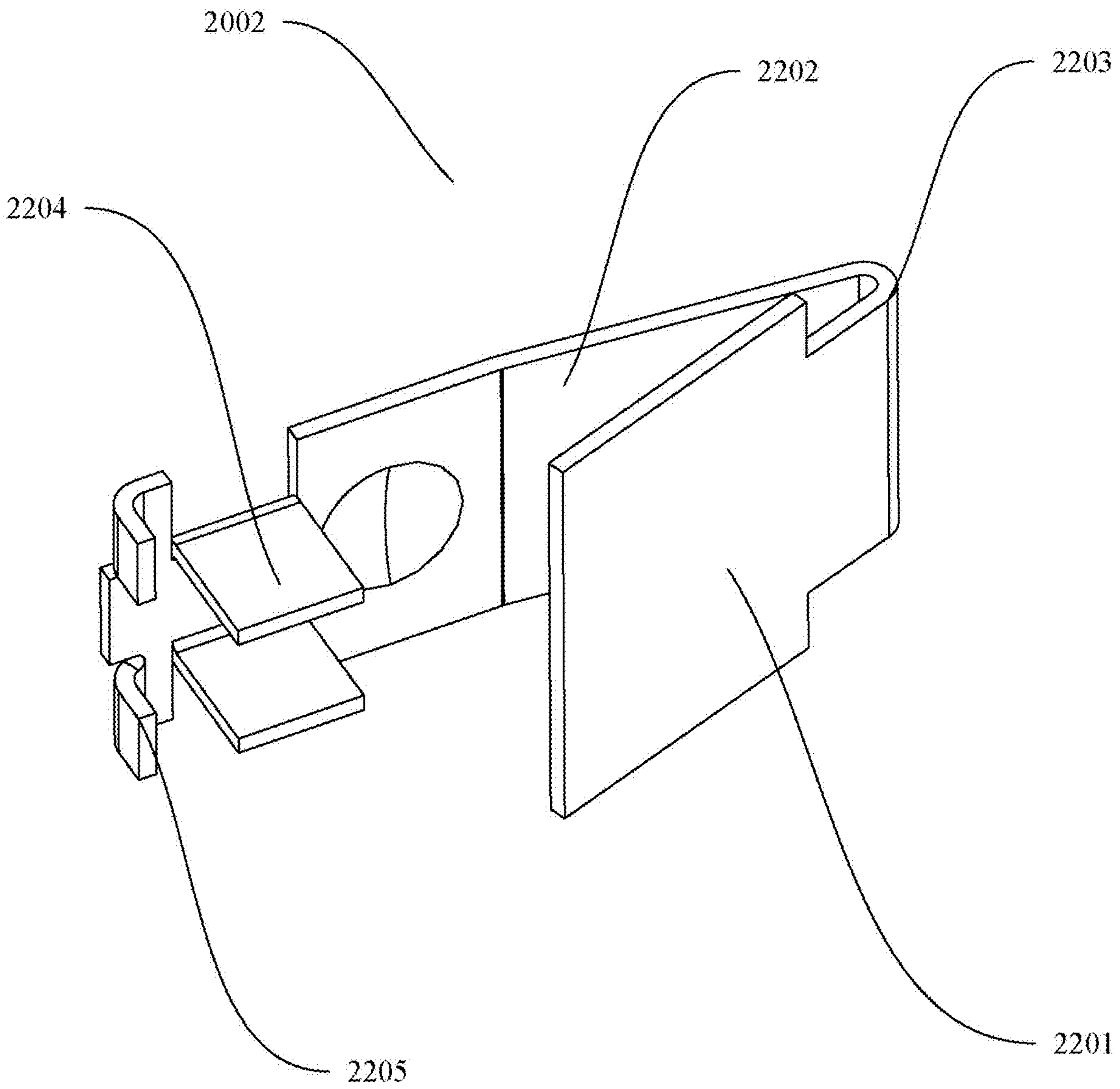
FIG. 3 is a structural schematic diagram of a conductive plate of the lamp of the present invention.

In this embodiment, referring to FIG. 3, the conductive plate 2003 is bent and molded to be installed in the plug-in slot 2002, the at least one conductive plate 2003 includes a first conductive plate 2201 and a second conductive plate 2202, a bend part 2203 is arranged between the first conductive plate 2201 and the second conductive plate 2202, and a distance between the first conductive plate 2201 and the second conductive plate 2202 gradually increases along a direction away from the bend part 2203. In this embodiment, the bend-molded design of the conductive plate 2003 enables the conductive plate 2003 to be more easily installed in the plug-in slot 2002, thereby simplifying the installation process, saving time and labor costs. The design in which the distance between the first conductive plate 2201 and the second conductive plate 2202 gradually increases along a direction away from the bend part 2203 can also make the conductive plate 2003 more flexible during the installation and use processes, and it can adapt to different installation requirements and space limitations. At the same time, the bent part 2203 enables the conductive plate 2003 to evenly distribute stress when subjected to external forces, reduces the risk of damage caused by single-point stress concentration, and improves the durability and reliability of the conductive plate 2003.

Figure 4:
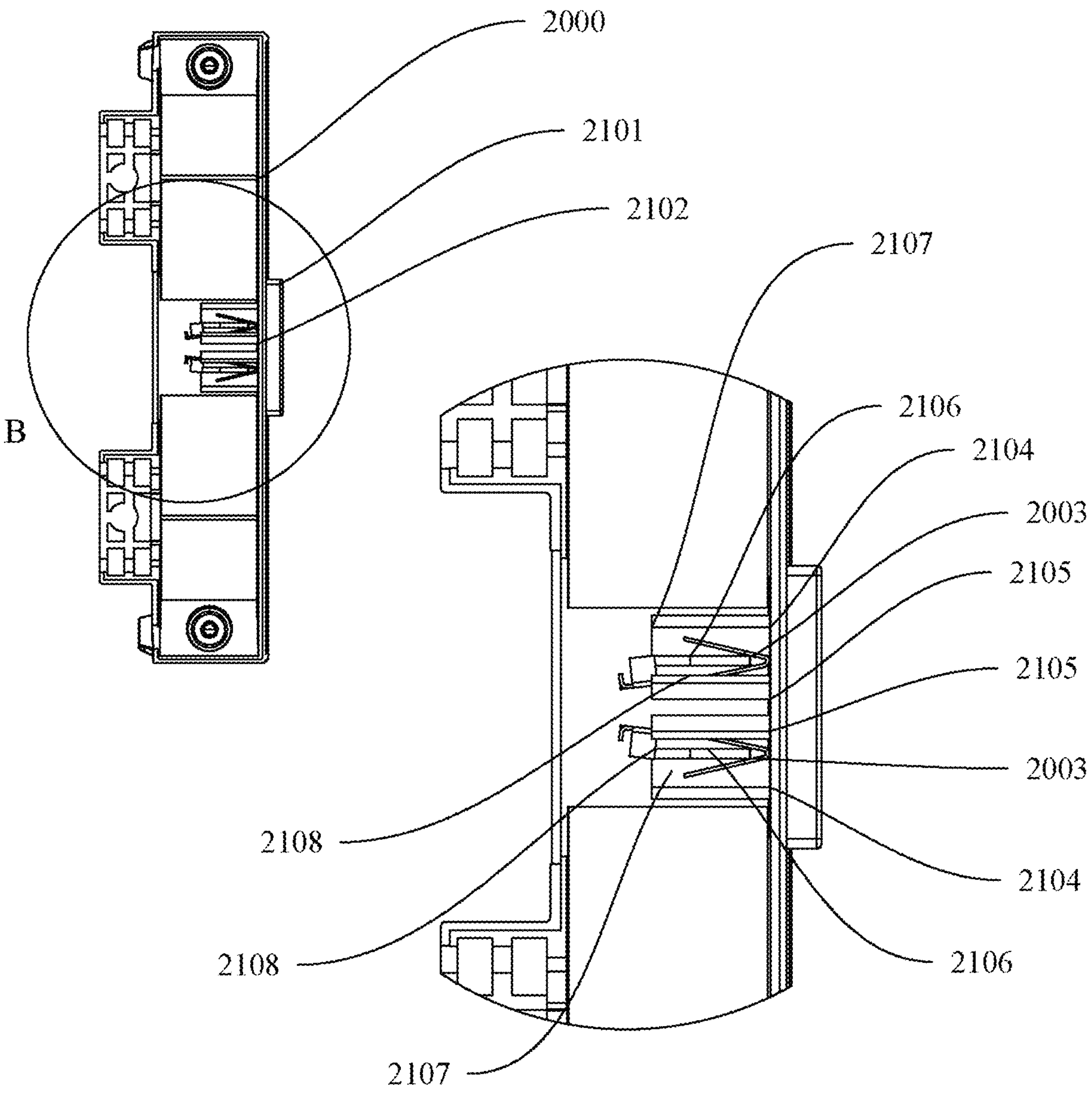
FIG. 4 is a partial enlarged diagram of the conductive plate and an electrical connector socket of an area B of FIG. 1.
Figure 5:
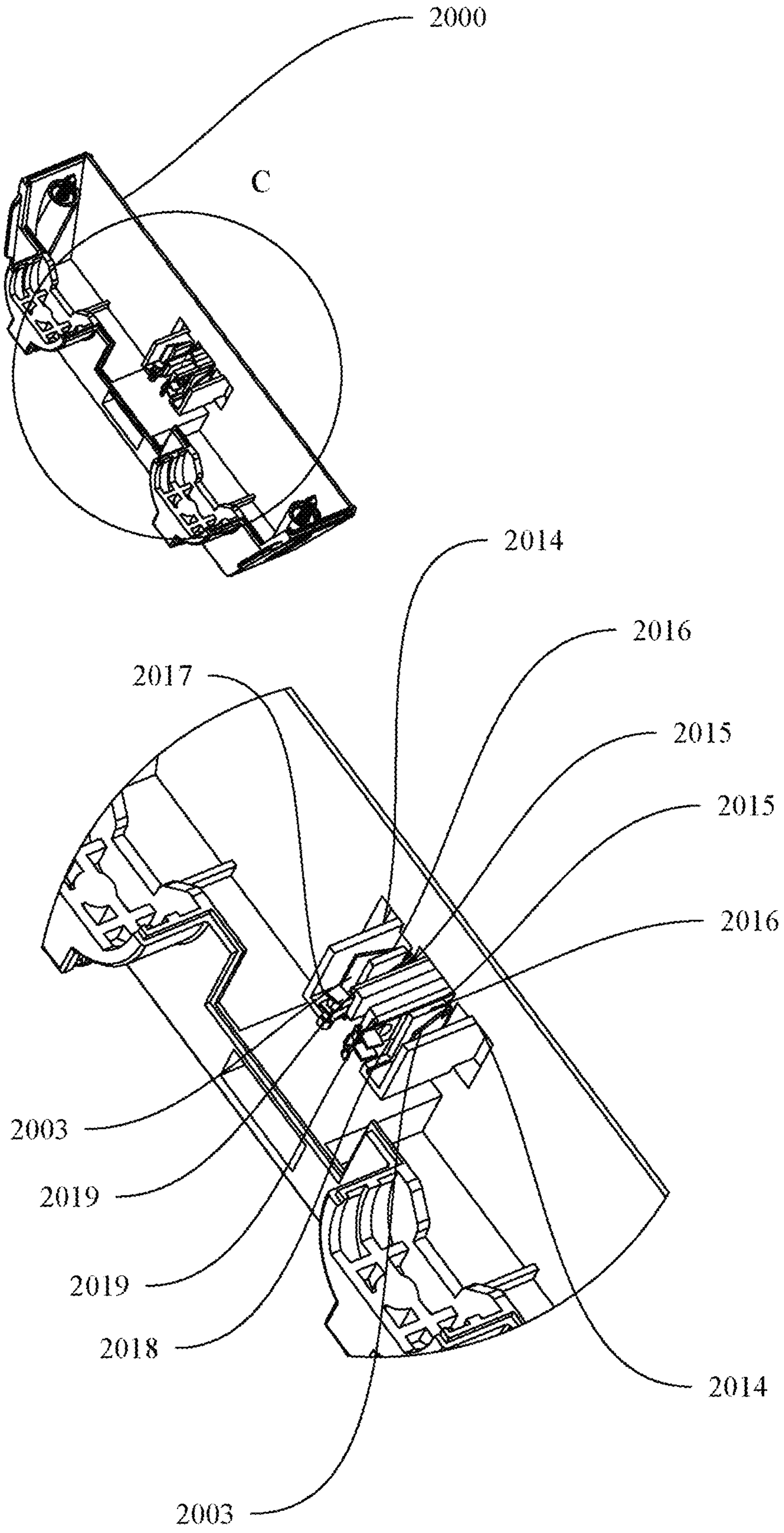
FIG. 5 is a partial enlarged diagram of the conductive sheet and the electrical connector socket of an area B of FIG. 1 from another view.

In this embodiment, referring to FIG. 4 to FIG. 5, the second end 2102 includes a first baffle 2104 and a second baffle 2105, the first baffle 2104 and the second baffle 2105 extend from the inner wall surface of the first end 2101 and are integrally formed with the first end 2101, the plug-in slot 2002 is limited by the first baffle 2104 and the second baffle 2105, a fixing board 2106 extends upwards from a bottom edge of the first baffle 2104 and is integrally formed with the first baffle 2104, a first accommodating part 2107 is arranged between the first baffle 2104 and the fixing board 2106 for accommodating the first conductive plate 2201, a second accommodating part 2108 is arranged between the second baffle 2105 and the fixing board 2106 for accommodating the second conductive plate 2202, and the bent part 2203 is positioned against an inner wall of the left end cover 2000 by the fixing board 2106. In this embodiment, the fixing board 2106 provides a stable supporting structure, the first accommodating part 2107 and the second accommodating part 2108 ensure the fixation and positioning of the conductive plate 2003 within the plug-in slot 2002, preventing the conductive plate 2003 from displacing during the use process.

In another embodiment, a radiating fin is arranged on the outside of each of the first baffle 2104 and the second baffle 2105, and the radiating fin can improve the radiating efficiency of the conductive plate 2003 in the working process.

In this embodiment, a limiting part 2109 extending toward the first baffle 2104 is provided at a top of the second baffle 2105, and the limiting part 2109 is configured to limit a movement of the conductive plate 2003 in a longitudinal direction. Therefore, the conductive plate 2003 is always kept in a good contact state during use, the stability and safety of the circuit are improved, and the problem of poor contact or short circuit caused by movement is solved.

In this embodiment, referring to FIG. 3, a contact bump 2204 formed by folding back from an edge of the second conductive plate 2202 is provided on the second conductive plate 2202, a wiring pin 2205 is provided on one side of the contact bump 2204 adjacent to the interior of the lamp body 1000, and the wiring pin 2205 is connected to the light source board 1001 through an electric wire. Through the design of the contact bump 2204 and the wiring pin 2205, the resistance can be effectively reduced, the conductive performance can be improved, and the stability and reliability of current transmission can be ensured.

In this embodiment, referring to FIG. 2, the lamp body 1000 further includes at least one strip tubular lampshade 1002, the light source board 1001 is a strip light source board 1001, and the strip light source board 1001 is arranged inside the at least one strip tubular lampshade 1002. The strip tubular lampshade 1002 can not only simulate the effect of traditional lamps, but also integrate with modern interior design to enhance the overall aesthetic.

In this embodiment, referring to FIG. 1 to FIG. 6, the lamp body further includes a housing 1003, each of two ends of the housing 1003 is detachably connected to the left end cover 2000 and the right end cover 3000 respectively, and the housing includes two sidewalls 1004 and a top wall 1005 positioned between the two sidewalls 1004. The left end cover 2000 and the right end cover 3000 are provided with a first limit block 3002 and a second limit block 3003 at an edge of each of two sides of the left end cover 2000 and the right end cover 3000, and at least a portion of the first limit block 3002 and at least a portion of the second limit block

3003 surround to form a limit groove 3004 for accommodating the sidewall 1004. Furthermore, the longitudinal length of the first limit block 3002 is greater than the longitudinal length of the second limit block 3003, the transverse width of the limit groove 3004 is not greater than the thickness of the sidewall 1004, and the limit groove 3004 can effectively fix the sidewall 1004 to prevent it from being displaced during use, thereby improving the stability of the overall structure.

In another embodiment, a plurality of heat dissipation holes are arranged on the sidewall 1004 of the housing 1003. The heat dissipation holes can effectively dissipate heat, prevent the lamp body 1000 from overheating during long-time operation, and thus prolong its service life.

Figure 7:
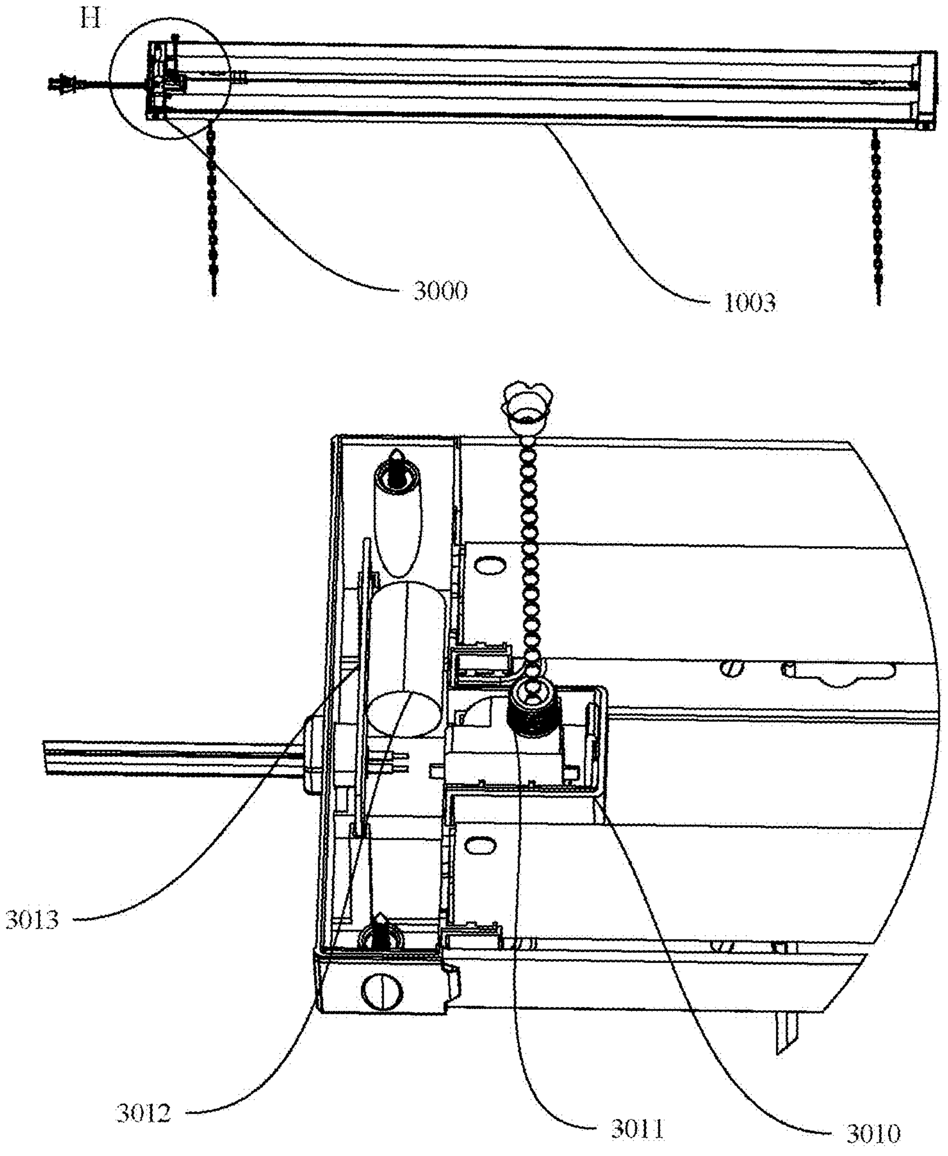
FIG. 7 is an explosion diagram of a left end cover and a right end cover of the lamp of the present invention.

In this embodiment, referring to FIG. 7, the left end cover 2000 and the right end cover 3000 include an upper housing 3005 and a lower housing 3006, the upper housing 3005 is provided with a concave portion 3101, the lower housing 3006 is provided with a convex portion 3201, the concave portion 3101 is able to receive the convex portion 3201 such that the upper housing 3005 is detachably installed in the lower housing 3006. Furthermore the upper housing 3005 is fixedly connected to the lower housing 3006 by a bolt. By the mating of the concave portion 3101 and the convex portion 3201 to connect the upper housing 3005 and the lower housing 3006, not only is the installation method simple and convenient, but also this mating method can effectively prevent the two housings from loosening or falling off during the use process, enhancing the stability of the overall structure.

In another embodiment, a sealing ring is arranged at the connection of the upper housing 3005 and the lower housing 3006 to further improve its sealing performance and prevent dust and moisture from entering the interior.

Figure 6:
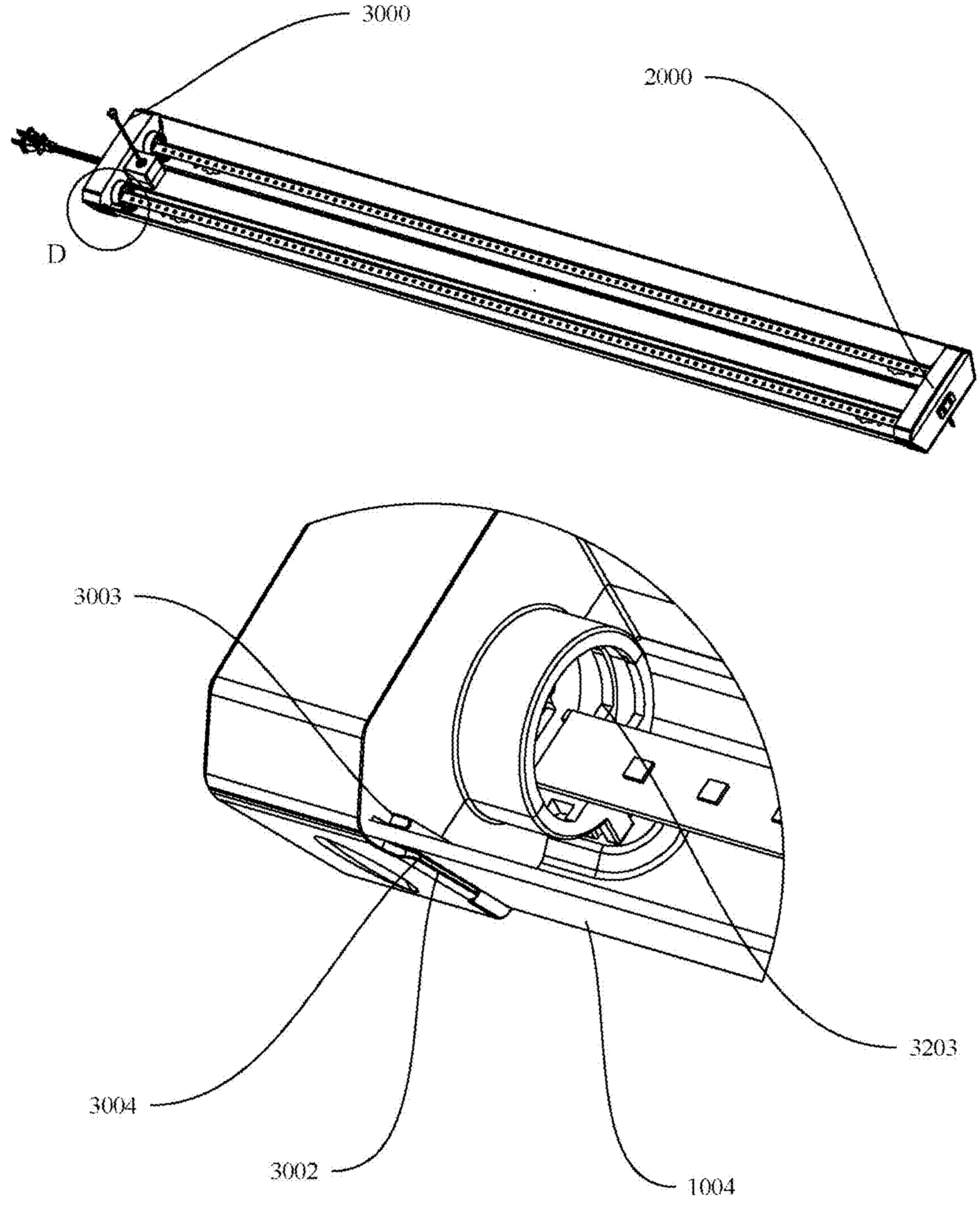
FIG. 6 is a partial enlarged diagram of an area D of FIG. 1.

In this embodiment, referring to FIG. 6 to FIG. 7, an inner wall of the upper housing 3005 is provided with at least one first snap-in portion 3102 on one side of the interior of the lamp body 1000, and the first snap-in portion 3102 is configured to install the light source board 1001 firmly. An inner wall of the lower housing 3006 is provided with at least one second snap-in portion 3202 on one side of the interior of the lamp body 1000. Furthermore, the first snap-in portion 3102 and the second snap-in portion 3202 cooperate to form a fixing cavity 3203 which can install the light source board 1001 and the strip tubular lampshade 1002 firmly. This design ensures that the light source board 1001 and the strip tubular lampshade 1002 will not become loose or displaced during use, improving the overall stability of the lamp body 1000.

In this embodiment, the first snap-in portion 3102 and the second snap-in portion 3202 are respectively provided with a protrusion 3103 on an inner wall surface of the first snap-in portion 3102 and the second snap-in portion 3202, and the protrusion 3103 is configured to fasten the at least one strip tubular lampshade 1002. Thus, it can ensure that the strip tubular lampshade 1002 will not become loose or displaced during use, and it can improve the overall stability of the lamp body 1000.

Figure 8:
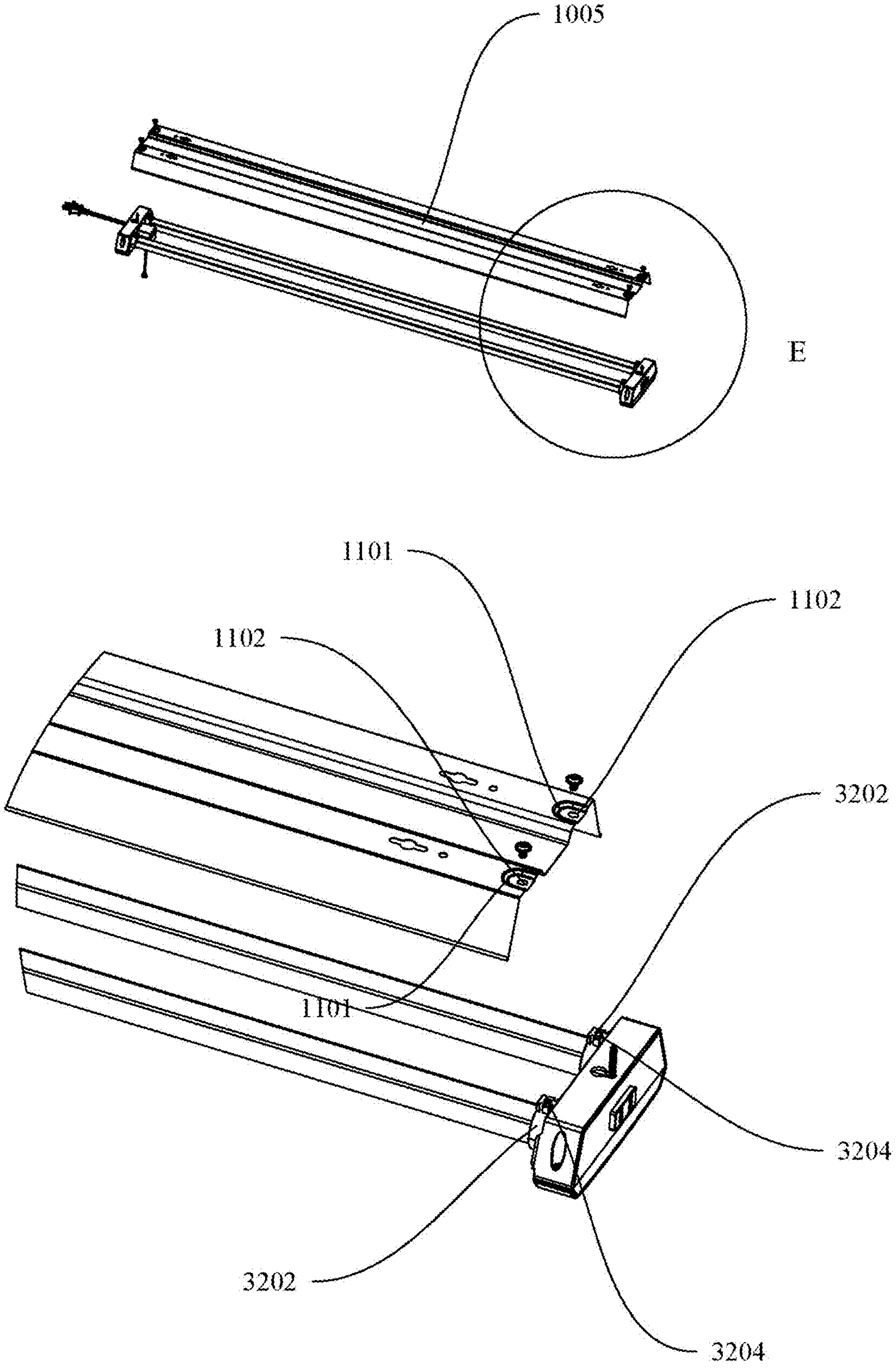
FIG. 8 is a partial enlarged diagram of an area E of FIG. 1 of the present invention.

In this embodiment, referring to FIG. 8, at least one recessed portion 1101 is provided at each of two ends of the top wall 1005, at least one mounting hole 1102 is provided in the recessed portion 1101, a threaded hole 3204 is provided at a top end of the first snap-in portion 3102, the mounting hole 1102 corresponds to the threaded hole 3204, and the lower housing 3006 and the top wall 1005 are fixed by a bolt which can pass through the mounting hole 1102 and be screwed into the threaded hole 3204.

In this embodiment, a hook part 1006 is arranged at each of the two ends of the top wall 1005 for connecting to a wall.

Figure 9:
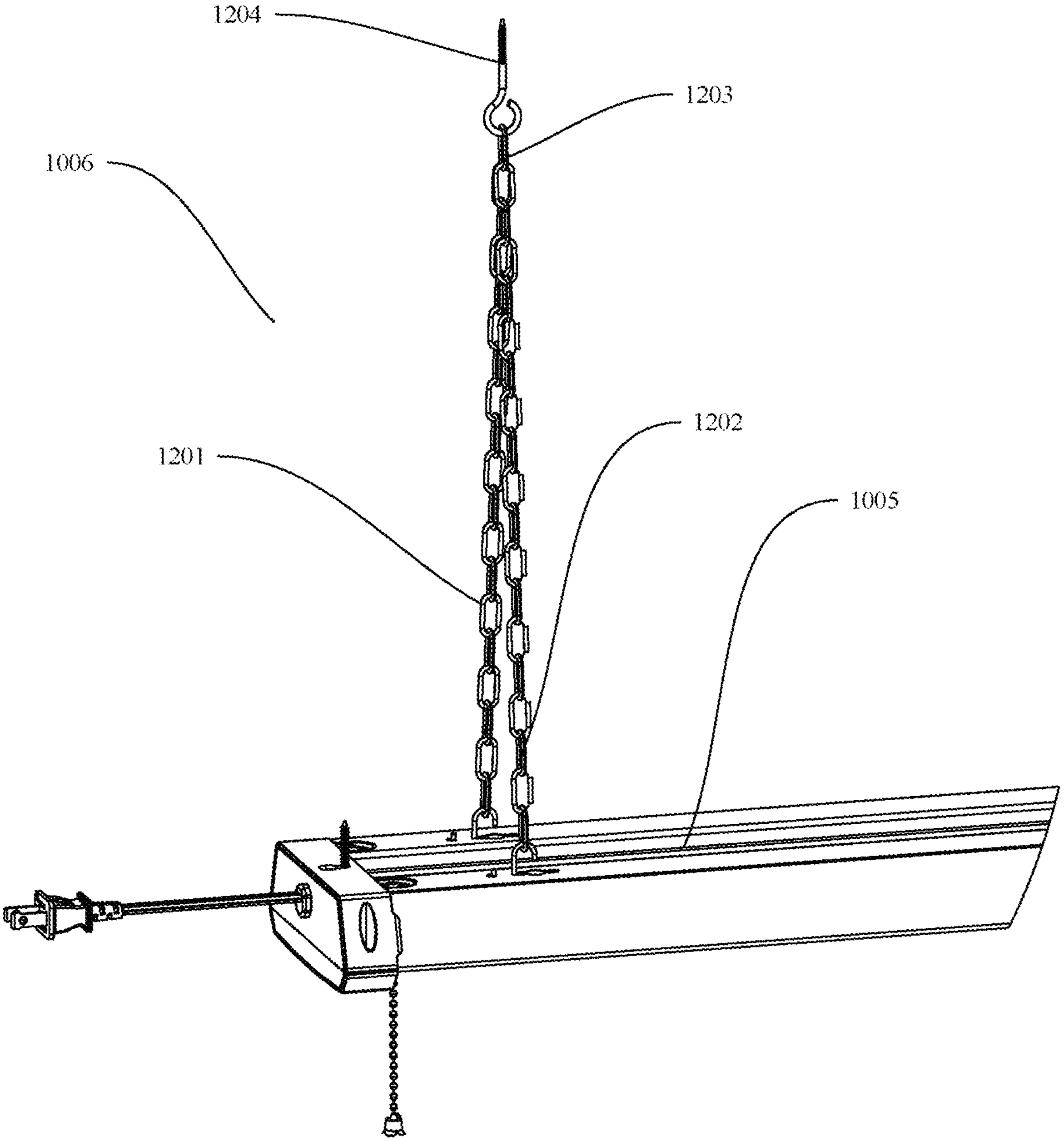
FIG. 9 is a partial enlarged diagram of an area H of FIG. 1.

A first preferred embodiment of the hook part 1006 in the present invention, referring to FIG. 9, the hook part 1006 includes a first hanging portion 1201, a second hanging portion 1202 and a first joining portion 1203, one end of the first hanging portion 1201 and one end of the second hanging portion 1202 are fixedly connected to the top wall 1005 respectively, the other end of the first hanging portion 1201 and the other end of the second hanging portion 1202 intersect and are connected together through the first joining portion 1203, a wall nail 1204 is connected to the first joining portion 1203, and the wall nail 1204 is configured to fixedly connect the hook part 1006 to the wall. Through the combined design of the first hanging portion 1201, the second hanging portion 1202 and the first joining portion 1203, the weight of the lamp body 1000 can be effectively dispersed, its load-bearing capacity can be improved, and structural damage caused by excessive weight can be prevented.

Figure 10:
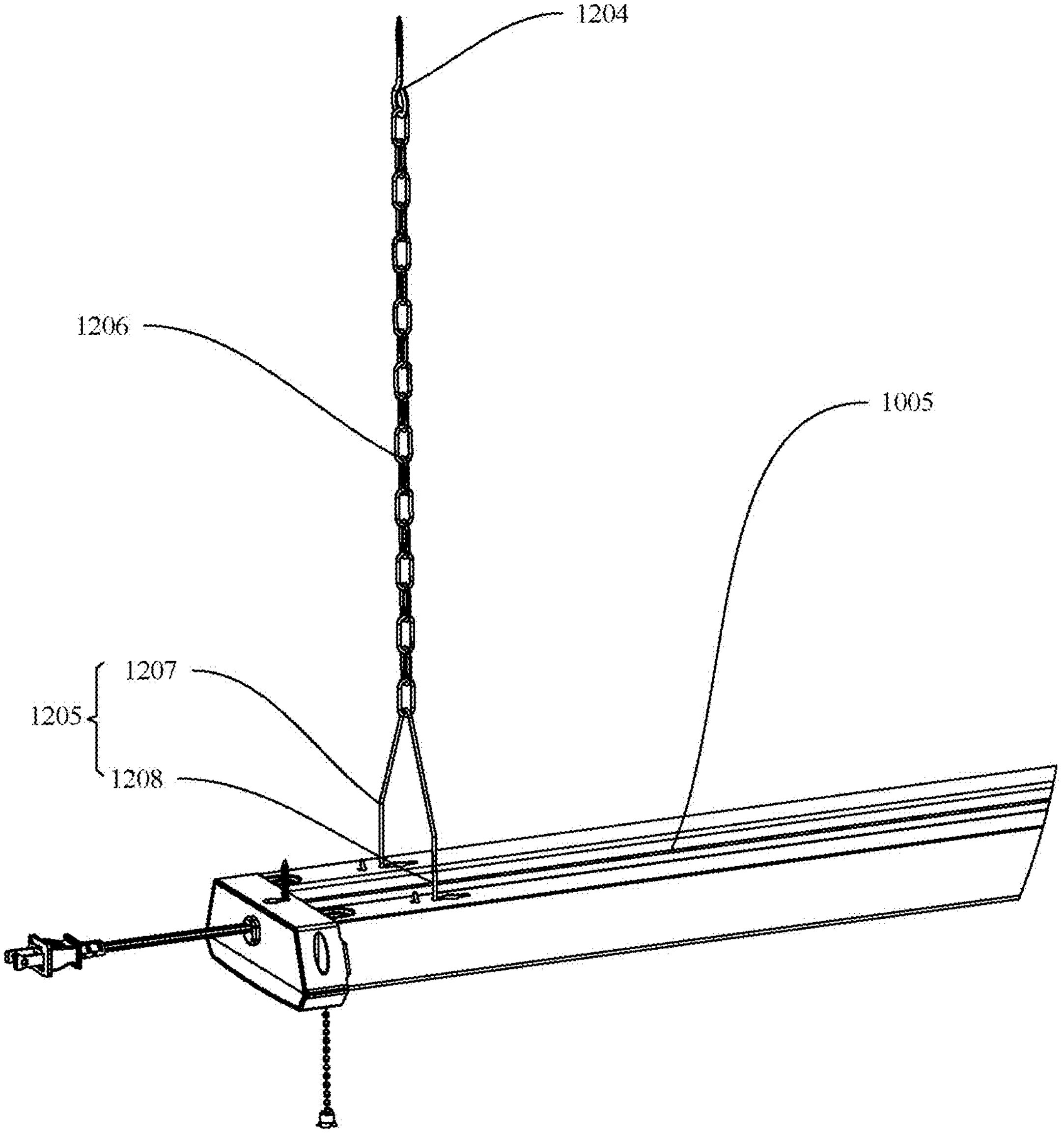
FIG. 10 is a partial enlarged diagram of an area F of FIG. 1 of another embodiment.

A second preferred embodiment of the hook part 1006 in the present invention, referring to FIG. 10, the hook part 1006 includes a third hanging portion 1205 and a fourth hanging portion 1206, the third hanging portion 1205 includes a first connecting element 1207 and a second connecting element 1208, one end of the first connecting element 1207 and one end of the second connecting element 1208 are fixedly connected to the top wall 1005 respectively, the other end of the first connecting element 1207 and the other end of the second connecting element 1208 are connected together through the fourth hanging portion 1206 and thus the third hanging portion 1205 has a "V"-shaped structure, the wall nail 1204 is further connected to the fourth hanging portion 1206, and the wall nail 1204 is configured to fixedly connect the hook part 1006 to the wall. Through the design of the "V"-shaped structure of the third hanging portion 1205, the third hanging portion 1205 can effectively disperse the weight of the lamp body 1000, improve its load-bearing capacity, and prevent structural damage caused by excessive weight.

Figure 11:
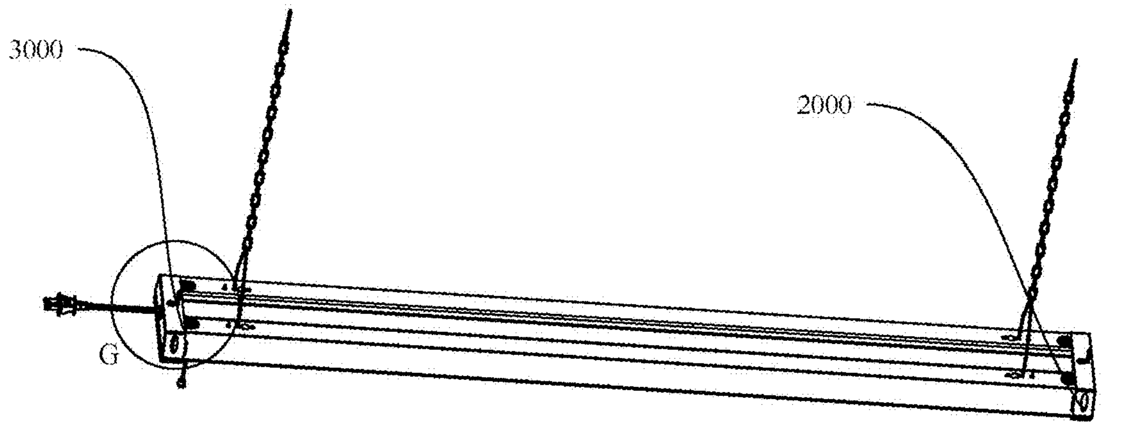
FIG. 11 is a partial enlarged diagram of a connection between the lamp and a wall of an area G of FIG. 1.
Figure 11:
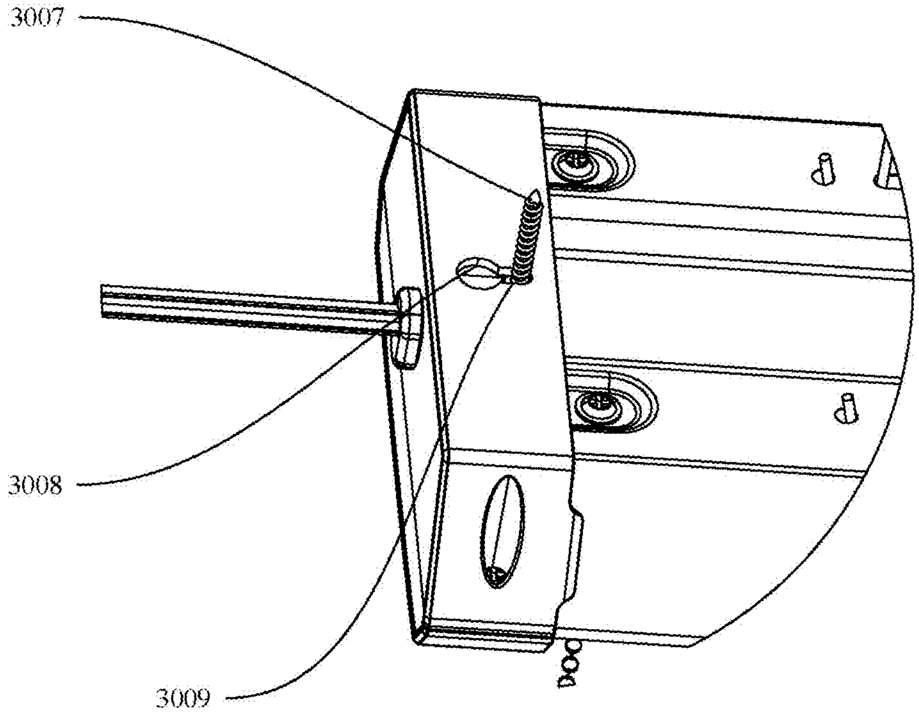

In this embodiment, referring to FIG. 11, the left end cover 2000 and the right end cover 3000 are respectively provided with a connecting portion 3007 configured to connect to the wall. As a preference in this embodiment, the connecting portion 3007 is a bolt. By using the bolt as the connecting portion 3007, a stronger fixing force can be provided to ensure that the lamp 100 will not be loosened or displaced during use, thereby enhancing the overall structural stability of the lamp.

In this embodiment, the left end cover 2000 and the right end cover 3000 are provided with a guide hole 3008 and a limit hole 3009 respectively, an edge portion of the guide hole 3008 intersects an edge portion of the limit hole 3009 thus the guide hole 3008 and the limit hole 3009 are connected, and a diameter of the guide hole is not less than a diameter of the limit hole. The connecting portion 3007 has a diameter matched with the limit hole 3009, so that the connecting portion 3007 can pass through the guide hole 3008 and move into the limit hole 3009 for fixation, thereby fixedly connecting the lamp 100 to the wall. By setting the guide hole 3008 and the limit hole 3009, the connecting portion 3007 can smoothly pass through the guide hole 3008 and move into the limit hole 3009 for fixation, which simplifies the installation process of the lamp 100. Moreover, the connecting portion 3007 can be firmly positioned in the limit hole 3009 after it is fixed, thereby ensuring the stable connection of the lamp 100 and reducing the risk of loosening or falling off.

Figure 12:
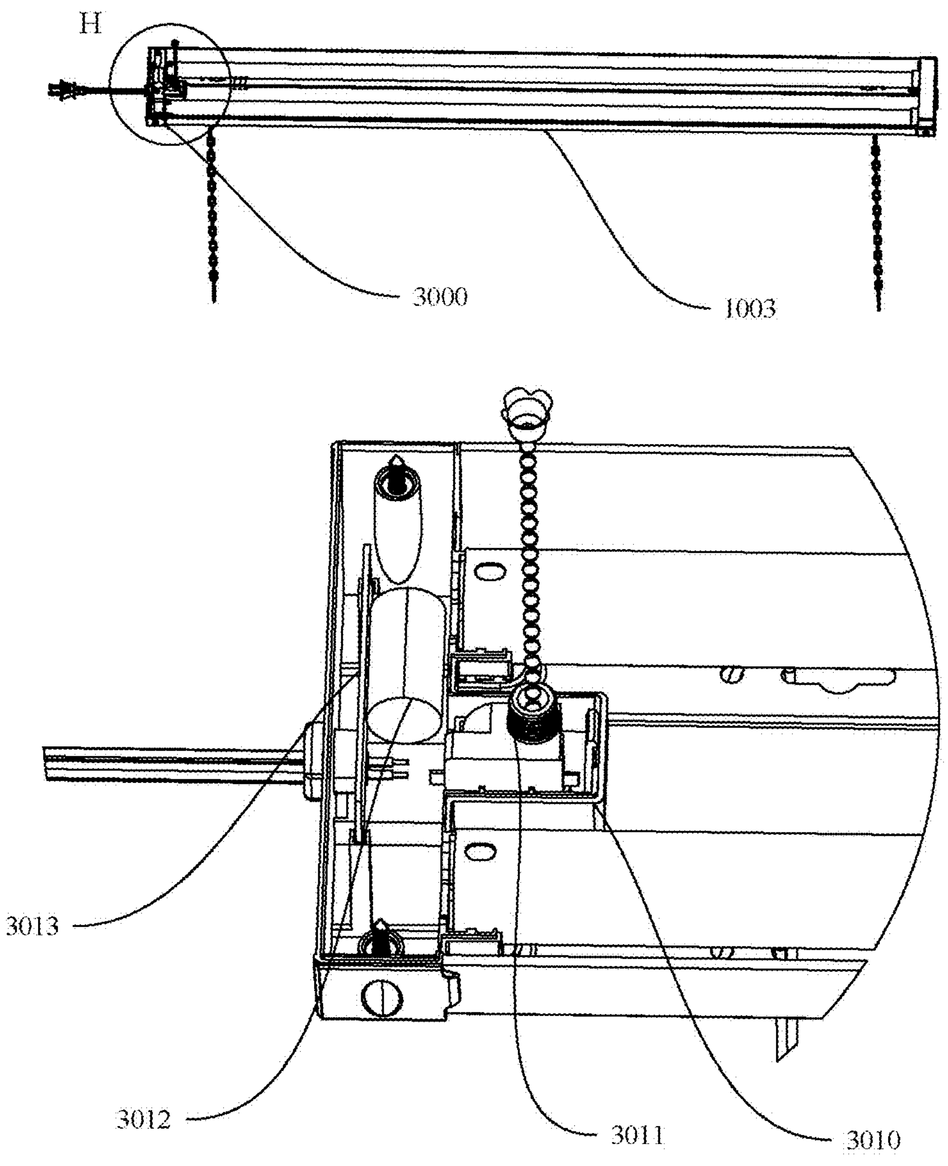
FIG. 12 is a partial enlarged diagram of of an interior of the right end cover of an area H of FIG. 1.

In this embodiment, referring to FIG. 12, a mounting base 3010 is further arranged in an inner wall of the right end cover 3000 at one side inside the housing 1003, a switching device 3011 is arranged in the mounting base, and the switching device is electrically connected to the light source board 1001 and the plug 3001. The integrated design reduces the use of external connecting wires, so that the overall structure is more compact and beautiful.

In this embodiment, a capacitor 3012 and a circuit board 3013 electrically connected to the capacitor 3012 are further arranged in the right end cover 3000, and the capacitor 3012 and the circuit board 3013 are electrically connected to the switching device 3011. The capacitor 3012 and the circuit board 3013 are integrated in the right end cover 3000, so that the internal structure of the whole lamp is more compact, the use of external connecting wires is reduced, and the overall beauty and installation convenience of the lamp are improved.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A lamp, comprising:

a lamp body, a left end cover and a right end cover detachably connected to each of two sides of the lamp body, wherein the lamp body comprises at least one light source board; the right end cover is provided with a plug for connecting to an external power source, and the plug is electrically connected to the light source board; the left end cover is provided with an electrical connector socket for connecting to an external control circuit, the electrical connector socket is provided with a plurality of plug-in slots on one side adjacent to an interior of the lamp body, at least one conductive plate is arranged in each of the plug-in slots, and the at least one conductive plate is electrically connected to the light source board;

wherein the lamp body further comprises a housing, each of two ends of the housing is detachably connected to the left end cover and the right end cover respectively, and the housing comprises two sidewalls and a top wall positioned between the two sidewalls;

wherein the left end cover and the right end cover are provided with a first limit block and a second limit block at an edge of each of two sides of the left end cover and the right end cover, and at least a portion of the first limit block and at least a portion of the second limit block surround to form a limit groove for accommodating the sidewall;

wherein the left end cover and the right end cover comprise an upper housing and a lower housing, the upper housing is provided with a concave portion, the lower housing is provided with a convex portion, the concave portion is able to receive the convex portion such that the upper housing is detachably installed in the lower housing.

2. The lamp according to claim 1, wherein the electrical connector socket comprises a first end and a second end, the second end extends from an inner wall surface of the first end, the first end is arranged outside the left end cover and abuts against an outer wall surface of the left end cover, the second end is arranged inside the left end cover and extends towards the interior of the lamp body, the first end is provided with a plurality of plug-in holes for connecting to the external control circuit, and the plug-in slot is arranged inside the second end and is connected to the plug-in hole.

3. The lamp according to claim 2, wherein the conductive plate is bent and molded to be installed in the plug-in slot, the at least one conductive plate comprises a first conductive plate and a second conductive plate, a bend part is arranged between the first conductive plate and the second conductive plate, and a distance between the first conductive plate and the second conductive plate gradually increases along a direction away from the bend part.

4. The lamp according to claim 3, wherein the second end comprises a first baffle and a second baffle, the first baffle and the second baffle extend from the inner wall surface of the first end and are integrally formed with the first end, the plug-in slot is limited by the first baffle and the second baffle, a fixing board extends upwards from a bottom edge of the first baffle and is integrally formed with the first baffle, a first accommodating part is arranged between the first baffle and the fixing board for accommodating the first conductive plate, a second accommodating part is arranged between the second baffle and the fixing board for accommodating the second conductive plate, and the bent part is positioned against an inner wall of the left end cover by the fixing board.

5. The lamp according to claim 4, wherein a limiting part extending toward the first baffle is provided at a top of the second baffle, and the limiting part is configured to limit a movement of the conductive plate in a longitudinal direction.

6. The lamp according to claim 5, wherein a contact bump formed by folding back from an edge of the second conductive plate is provided on the second conductive plate, a wiring pin is provided on one side of the contact bump adjacent to the interior of the lamp body, and the wiring pin is connected to the light source board through an electric wire.

7. The lamp according to claim 1, wherein the lamp body further comprises at least one strip tubular lampshade, the light source board is a strip light source board, and the strip light source board is arranged inside the at least one strip tubular lampshade.

8. The lamp according to claim 1, wherein an inner wall of the upper housing is provided with at least one first snap-in portion on one side of the interior of the lamp body, and the first snap-in portion is configured to fixedly install the light source board.

9. The lamp according to claim 8, wherein an inner wall of the lower housing is provided with at least one second snap-in portion on one side of the interior of the lamp body, the first snap-in portion and the second snap-in portion cooperate to form a fixing cavity, and the fixing cavity is configured to fixedly install the at least one strip tubular lampshade.

10. The lamp according to claim 9, wherein the first snap-in portion and the second snap-in portion are respectively provided with a protrusion on an inner wall surface of the first snap-in portion and the second snap-in portion, and the protrusion is configured to fasten the at least one strip tubular lampshade.

11. The lamp according to claim 10, wherein at least one recessed portion is provided at each of two ends of the top wall, at least one mounting hole is provided in the recessed portion, a threaded hole is provided at a top end of the first snap-in portion, the mounting hole corresponds to the threaded hole, a bolt is inserted into the mounting hole, and the bolt passes through the mounting hole and extends into the threaded hole to be screwed, so that the lower housing is detachably connected to the top wall.

12. The lamp according to claim 11, wherein the top wall is further provided with a hook part configured to be connected to a wall.

13. The lamp according to claim 12, wherein the hook part comprises a first hanging portion, a second hanging portion and a first joining portion, one end of the first hanging portion and one end of the second hanging portion are fixedly connected to the top wall respectively, the other end of the first hanging portion and the other end of the second hanging portion intersect and are connected together through the first joining portion, a wall nail is connected to the first joining portion, and the wall nail is configured to fixedly connect the hook part to the wall.

14. The lamp according to claim 12, wherein the hook part further comprises a third hanging portion and a fourth hanging portion, the third hanging portion comprises a first connecting element and a second connecting element, one end of the first connecting element and one end of the second connecting element are fixedly connected to the top wall respectively, the other end of the first connecting element and the other end of the second connecting element are connected together through the fourth hanging portion and thus the third hanging portion has a “V”-shaped structure, the wall nail is further connected to the fourth hanging portion, and the wall nail is configured to fixedly connect the hook part to the wall.

15. The lamp according to claim 1, wherein the left end cover and the right end cover are provided with a guide hole and a limit hole respectively, the guide hole and the limit hole are configured to allow an external connecting portion to pass through and thus the lamp connects to a wall, an edge portion of the guide hole intersects an edge portion of the limit hole thus the guide hole and the limit hole are connected, and a diameter of the guide hole is not less than a diameter of the limit hole.

16. The lamp according to claim 1, wherein a mounting base is further arranged in the right end cover, a switching device is arranged in the mounting base, and the switching device is electrically connected to the light source board and the plug.

17. The lamp according to claim 1, wherein a capacitor and a circuit board electrically connected to the capacitor are further arranged in the right end cover, and the capacitor and the circuit board are electrically connected to the switching device.

18. A lamp, comprising:

a lamp body, a left end cover and a right end cover detachably connected to each of two sides of the lamp body, wherein the lamp body comprises at least one light source board; the right end cover is provided with a plug for connecting to an external power source, and the plug is electrically connected to the light source board; the left end cover is provided with an electrical connector socket for connecting to an external control circuit, the electrical connector socket is provided with a plurality of plug-in slots on one side adjacent to an interior of the lamp body, at least one conductive plate is arranged in each of the plug-in slots, and the at least one conductive plate is electrically connected to the light source board;

wherein the electrical connector socket comprises a first end and a second end, the second end extends from an inner wall surface of the first end, the first end is arranged outside the left end cover and abuts against an outer wall surface of the left end cover, the second end is arranged inside the left end cover and extends towards the interior of the lamp body, the first end is provided with a plurality of plug-in holes for connecting to the external control circuit, and the plug-in slot is arranged inside the second end and is connected to the plug-in hole;

wherein the conductive plate is bent and molded to be installed in the plug-in slot, the at least one conductive plate comprises a first conductive plate and a second conductive plate, a bend part is arranged between the first conductive plate and the second conductive plate, and a distance between the first conductive plate and the second conductive plate gradually increases along a direction away from the bend part;

wherein the second end comprises a first baffle and a second baffle, the first baffle and the second baffle extend from the inner wall surface of the first end and are integrally formed with the first end, the plug-in slot is limited by the first baffle and the second baffle, a fixing board extends upwards from a bottom edge of the first baffle and is integrally formed with the first baffle, a first accommodating part is arranged between the first baffle and the fixing board for accommodating the first conductive plate, a second accommodating part is arranged between the second baffle and the fixing board for accommodating the second conductive plate, and the bent part is positioned against an inner wall of the left end cover by the fixing board.

* * * * *